United States Patent
Alston

[19]

[11] Patent Number: 6,055,285
[45] Date of Patent: Apr. 25, 2000

[54] SYNCHRONIZATION CIRCUIT FOR TRANSFERRING POINTER BETWEEN TWO ASYNCHRONOUS CIRCUITS

[75] Inventor: Jerald Alston, Portola Hills, Calif.

[73] Assignee: QLogic Corporation, Aliso Viejo, Calif.

[21] Appl. No.: 08/971,387

[22] Filed: Nov. 17, 1997

[51] Int. Cl.[7] .................................................. H04L 25/40
[52] U.S. Cl. ........................... 375/372; 375/356; 375/358
[58] Field of Search .................................... 375/356, 357, 375/358, 371, 372

[56] References Cited

U.S. PATENT DOCUMENTS

| | | |
|---|---|---|
| 4,255,960 | 3/1981 | Masters . |
| 4,390,969 | 6/1983 | Hayes . |
| 4,408,333 | 10/1983 | Fujii . |
| 4,498,176 | 2/1985 | Wagner . |
| 4,745,302 | 5/1988 | Hanawa et al. . |
| 4,851,710 | 7/1989 | Grivna . |
| 4,866,606 | 9/1989 | Kopetz . |
| 4,873,703 | 10/1989 | Crandall et al. .................. 375/371 |
| 4,920,535 | 4/1990 | Watanabe et al. . |
| 4,926,445 | 5/1990 | Robb . |
| 4,935,942 | 6/1990 | Hwang et al. . |
| 4,965,465 | 10/1990 | Denda . |
| 4,973,860 | 11/1990 | Ludwig . |
| 5,012,127 | 4/1991 | Gates et al. . |
| 5,083,049 | 1/1992 | Kagey . |
| 5,117,442 | 5/1992 | Hall . |
| 5,146,585 | 9/1992 | Smith, III . |
| 5,155,745 | 10/1992 | Sugawara et al. . |
| 5,237,593 | 8/1993 | Fisher et al. . |
| 5,276,807 | 1/1994 | Kodama et al. . |
| 5,331,669 | 7/1994 | Wang et al. . |
| 5,563,891 | 10/1996 | Wang ...................................... 370/505 |
| 5,604,773 | 2/1997 | Urala ...................................... 375/372 |
| 5,651,034 | 7/1997 | Oksanen et al. ........................ 375/372 |
| 5,729,719 | 3/1998 | Gates . |
| 5,905,766 | 5/1999 | Nguyen .................................. 375/354 |
| 5,956,748 | 9/1999 | New ....................................... 711/149 |

*Primary Examiner*—Stephen Chin
*Assistant Examiner*—Lenny Jiang
*Attorney, Agent, or Firm*—Knobbe, Martens, Olson & Bear, LLP

[57] ABSTRACT

A synchronization circuit synchronizes the transfer of pointer values from a transmitting circuit operating in a first clock domain to a receiving circuit operating in a second clock domain, wherein the first clock domain and the second clock domain are mutually asynchronous. An input latch operating in response to a first synchronization signal generated in the first clock domain transfers a pointer value to a latched pointer bus. The first synchronization signal is provided as an input to a synchronization section which generates a second synchronization signal in the second clock domain. The second synchronization signal enables an output latch to transfer the pointer value on the latched pointer bus to an output bus. The pointer value on the output bus is thus synchronized in the second clock domain. The second synchronization signal is then provided as an input to a synchronization section which generates the first synchronization signal in the first clock domain. The first synchronization signal initiates the transfer of the next pointer value to the latched pointer bus. The synchronization circuit operates alternately to generate the first synchronization signal in the first clock domain and the second synchronization signal in the second clock domain to latch a pointer value onto the latched pointer bus in the first clock domain and to output the pointer value from the latched pointer bus in the second clock domain.

4 Claims, 6 Drawing Sheets

SYNCHRONIZATION CIRCUIT FOR TRANSFERRING POINTER BETWEEN TWO ASYNCHRONOUS CIRCUITS

BACKGROUND OF THE INVENTION

1. Field of the Invention

The present invention is in the field of digital circuits, and, more particularly, is in the field of synchronization circuits for synchronizing the transfer of data between two asynchronous digital circuits.

2. Description of the Related Art

Digital circuits in an electronic system, such as, for example, a computer system, are typically controlled by a common clock signal or by a plurality of clock signals derived from a common clock signal. Thus, the circuits are "synchronized" with respect to each other so that a signal generated by a first circuit in the system can be received by and clocked into other circuits in the system because the signals generated by the first circuit have a known phase relationship with respect to the common system clock signals. The known phase relationships typically do not exist for circuits that are controlled by independent clock signals. For example, peripheral components of a computer system often use independent clocks so that the peripheral component operates at a known frequency irrespective of the operating frequency of a computer system to which it is interconnected. Although the clock signals of a peripheral component and a computer system may have the same or similar frequencies, even very small differences in the clock frequencies cause the phase relationships between the clock signals to vary. Thus, the independent clock signals are "asynchronous" with respect to each other. Therefore, if a signal is generated by a circuit controlled by a clock which is asynchronous with the system clock of a computer system, the signal cannot be simply provided to the circuits of the computer system and clocked by the clock signals derived from the system clock. Rather, the signal must be synchronized to the system clock before the signal can be applied to the circuits of the computer system.

One particular aspect of communications between two asynchronous circuits is the transfer of data values between the two circuits. This becomes a particularly difficult problem when the two circuits operate at significantly different data rates such that one circuit can transmit data at a substantially faster data rate than the other circuit can receive it or vice versa. The data can be transferred one unit of data at a time (i.e., on a byte-by-byte basis or on a multiple byte basis wherein the multiple bytes comprise a unit of data such as a word or a double word) such that one circuit places the unit of data on a transmission bus; sets an indicator that informs the other circuit that the unit of data is ready; waits until the other circuit receives the unit of data and acknowledges receipt; clears the data ready indicator; places the next unit of data on the transmission bus; and then sets the indicator that the next unit of data is ready. Although such a system works for many systems, it is not an efficient method for transferring large amounts of data, particularly when the receiving circuit may not be ready to receive the data when the transmitting circuit is ready to send the data.

One solution to the foregoing problem is the use of a multiple data unit buffer. Such a buffer is often referred to as a FIFO (first-in/first-out) buffer. The transmitting circuit stores units of data in a plurality of storage locations within the FIFO buffer whenever the data units become available within the transmitting circuit. An input address signal selects the storage location within the FIFO buffer and a write enable signal causes the FIFO buffer to store a data unit at the selected storage unit. The input address signal and the write enable signal are synchronized to the digital clock signal within the transmitting circuit. Similarly, the receiving circuit reads units of data from the FIFO buffer whenever the receiving circuit is ready to process the data units. The receiving circuit selects a storage location to read by applying an address to the FIFO buffer in synchronism with the digital clock signal within the receiving circuit. Thus, the data units output from the FIFO buffer change at known times with respect to the clock signal in the receiving circuit.

FIFO buffers are frequently referred to as circular buffers. That is, the transmitting circuit increments a write address counter each time it stores a data unit in a storage location in the FIFO buffer. The write address counter has a maximum count value which usually corresponds to the number of storage locations in the FIFO buffer. For example, if the FIFO buffer comprises 256 storage locations, the write address counter counts from 0 to 255, wherein a count of zero addresses the first storage location in the FIFO buffer and a count of 255 addresses the 256th storage location in the FIFO buffer. Typically, the write address counter is a modulo counter. That is, when the write address counter reaches its maximum count value (e.g., 255 in this example), the next count value is the minimum count (e.g., 0). Thus, the next address location into which a data unit will be stored following the storage of a data unit in the maximum address location is the minimum address location. As discussed above, the write address counter is advanced in synchronism with the clock signal of the transmitting circuit.

The receiving circuit maintains its own read address counter which is typically similar to the write address counter and which counts from the lowest address location to the maximum address location and then starts again from the lowest address location. The read address counter is incremented in synchronism with the clock signal in the receiving circuit.

Without going into details unnecessary for the understanding of the present invention, the transmitting circuit includes a FIFO buffer write control circuit which compares the current value of the write address counter with the current value of the read address counter to determine whether data can be written into the write address location corresponding to the current value of the write counter without writing over previously written data that has not yet been read by the receiving circuit. Similarly, the receiving circuit includes a FIFO buffer read control circuit which compares the current value of the write address counter with the current value of the read address counter to determine whether the next address location to be read has been written since the last time the address location was read. Briefly, the read address counter trails the write address counter, and neither address counter is allowed to count beyond the count value in the other counter.

In order for the FIFO buffer write control circuit in the transmitting circuit and the FIFO buffer read control circuit in the receiving circuit to operate properly, it is important that the write address counter be stable when read by the read address control circuit and that the read address counter be stable when read by the write address control circuit. Because the write address counter is changed in synchronism with the transmitting circuit clock and because the read address counter is changed in synchronism with the receiving circuit clock, neither counter can be read by the other circuit without synchronization. Thus, it is necessary to synchronize the output of the write address counter to the receiving circuit clock so that the count value of the write address counter is stable when read by the FIFO read control circuit, and it is also necessary to synchronize the output of the read address counter to the transmitting circuit clock so that the count value of the read address counter is stable when read by the FIFO write address control circuit.

SUMMARY OF THE INVENTION

The present invention is a synchronization circuit which synchronizes a counter value generated in a first clock domain to a clock signal in a second clock domain.

One aspect of the present invention is a pointer synchronization circuit for a buffer system. The pointer synchronization circuit receives a pointer received in synchronism with a first clock and generates a pointer synchronized to a second clock. The pointer synchronization circuit comprises a first latch which receives the pointer in synchronism with the first clock. The first latch provides a latched pointer as an output. A second latch receives the latched pointer from the first latch and outputs the pointer in synchronism with the second clock. Synchronization logic generates a first latch enable signal in synchronism with the first clock to control the first latch and generates a second latch enable signal in synchronism with the second clock to control the second latch. The synchronization logic times the second latch enable signal with respect to the first latch enable signal to ensure that the latched pointer signal is stable with respect to the second clock signal before generating the second latch enable signal. The synchronization logic further times the first latch enable signal with respect to the second latch enable signal to ensure that the second latch has received a previous value of the latched pointer before enabling the first latch to generate a new value of the latched pointer.

An important feature of the synchronization circuit is that there is no requirement that one clock have a higher frequency than the other clock. Thus, the circuit will function properly regardless of whether the first clock is faster than the second clock or vice versa.

Another aspect of the present invention is a synchronization circuit which controls an interface between a write controller and a read controller in a buffer system. The write controller provides a write pointer in synchronism with a first clock, and the read controller provides a read pointer in synchronism with a second clock. The synchronization circuit comprises a first latch which receives the write pointer in synchronism with the first clock and which generates a latched write pointer. A second latch receives the latched write pointer and generates a synchronized write pointer in synchronism with the second clock. A third latch receives the read pointer in synchronism with the second clock and generates a latched read pointer. A fourth latch receives the latched read pointer and generates a synchronized read pointer in synchronism with the first clock. Synchronization logic generates first, second, third and fourth latch enable signals which control the first, second, third and fourth latches, respectively. The synchronization logic times the first latch enable signal with respect to the second latch enable signal to assure that the latched write pointer is stable with respect to the second clock signal before the second latch is enabled to generate the synchronized write pointer. The synchronization logic times the first latch enable signal with respect to the second latch enable signal to assure that the second latch has received a previous value of the latched write pointer before enabling the first latch to generate a new value of the latched write pointer. The synchronization logic times the fourth latch enable signal with respect to the third latch enable signal to assure that the latched read pointer is stable with respect to the first clock signal before the fourth latch is enabled to generate the synchronized read pointer. The synchronization logic times the third latch enable signal with respect to the fourth latch enable signal to assure that the fourth latch has received a previous value of the latched read pointer before enabling the third latch to generate a new value of the latched read pointer. Preferably, the first latch enable signal and the third latch enable signal comprise a single latch enable signal synchronized to the first clock signal, and the second latch enable signal and the fourth latch enable signal comprise a single latch enable signal synchronized to the second clock signal.

Another aspect of the present invention is a data transmission system for transmitting data generated in a first clock domain to a receiving system operating in a second clock domain. The data transmission system includes a transmitting circuit which transmits data in synchronism with a first clock, a receiving circuit operating in synchronism with a second clock, and a memory system. The memory system comprises a buffer. A write controller operates in synchronism with the first clock and generates a write pointer. A read controller operates in synchronism with a second clock and generates a read pointer. The memory system further comprises a synchronization circuit which provides an interface between the write controller and the read controller. The data transmission system includes a first latch responsive to a first latch enable signal. The first latch receives the write pointer in synchronism with the first clock and generates a latched write pointer. A second latch is responsive to a second latch enable signal. The second latch receives the latched write pointer from the first latch and generates a synchronized write pointer in synchronism with the second clock. A third latch is responsive to a third latch enable signal. The third latch receives the read pointer in synchronism with the second clock and generates a latched read pointer. A fourth latch is responsive to a fourth latch enable signal. The fourth latch receives the latched read pointer from the third latch and generates a synchronized read pointer in synchronism with the first clock. Synchronization logic controls the first, second, third and fourth latch enable signals. The synchronization logic generates the first latch enable signal in synchronism with the first clock signal and generates the second latch enable signal in synchronism with the second clock signal in alternating relationship with the generation of the first latch enable signal. The second latch enable signal is timed to occur a sufficient time after the first latch enable signal occurs to ensure that the latched write pointer signal is stable in the second clock domain before being latched by the second latch. The first latch enable signal is timed to occur a sufficient time after the second latch enable signal occurs to ensure that the second latch has received a previously latched write pointer before the first latch generates a subsequent latched write pointer, the synchronization logic generating the third latch enable signal in synchronism with the second clock signal and generating the fourth latch enable signal in synchronism with the first clock signal in alternating relationship with the generation of the third latch enable signal, the fourth latch enable signal timed to occur a sufficient time after the third latch enable signal occurs to ensure that the latched read pointer signal is stable in the first clock domain before being latched by the fourth latch, the third latch enable signal timed to occur a sufficient time after the fourth latch enable signal occurs to ensure that the fourth latch has received a previously latched read pointer before the third latch generates a subsequent latched read pointer.

Preferably, the first latch enable signal and the third latch enable signal comprise a single latch enable signal synchronized to the first clock signal, the second latch enable signal and the fourth latch enable signal comprise a single latch enable signal synchronized to the second clock signal.

Another aspect of the present invention is a method for receiving a pointer in synchronism with a first clock signal and synchronizing the pointer to a second clock signal. The method comprises the step of generating a first synchronization signal in synchronism with the first clock; applying the first synchronization signal to a first latch to enable the latch to receive the pointer and generate a latched pointer; generating a second synchronization signal in a first synchronization circuit in response to the first synchronism signal, the second synchronization signal being synchronized with the second clock signal; applying the second synchronization signal to a second latch to enable the second latch to receive the pointer and generate a synchronized pointer; and generating the first synchronization signal in a second synchronization circuit in response to the second synchronization signal.

BRIEF DESCRIPTION OF THE DRAWINGS

The present invention will be described below in connection with the accompanying drawing figures in which.

DETAILED DESCRIPTION OF THE PREFERRED EMBODIMENT

Figure 1:
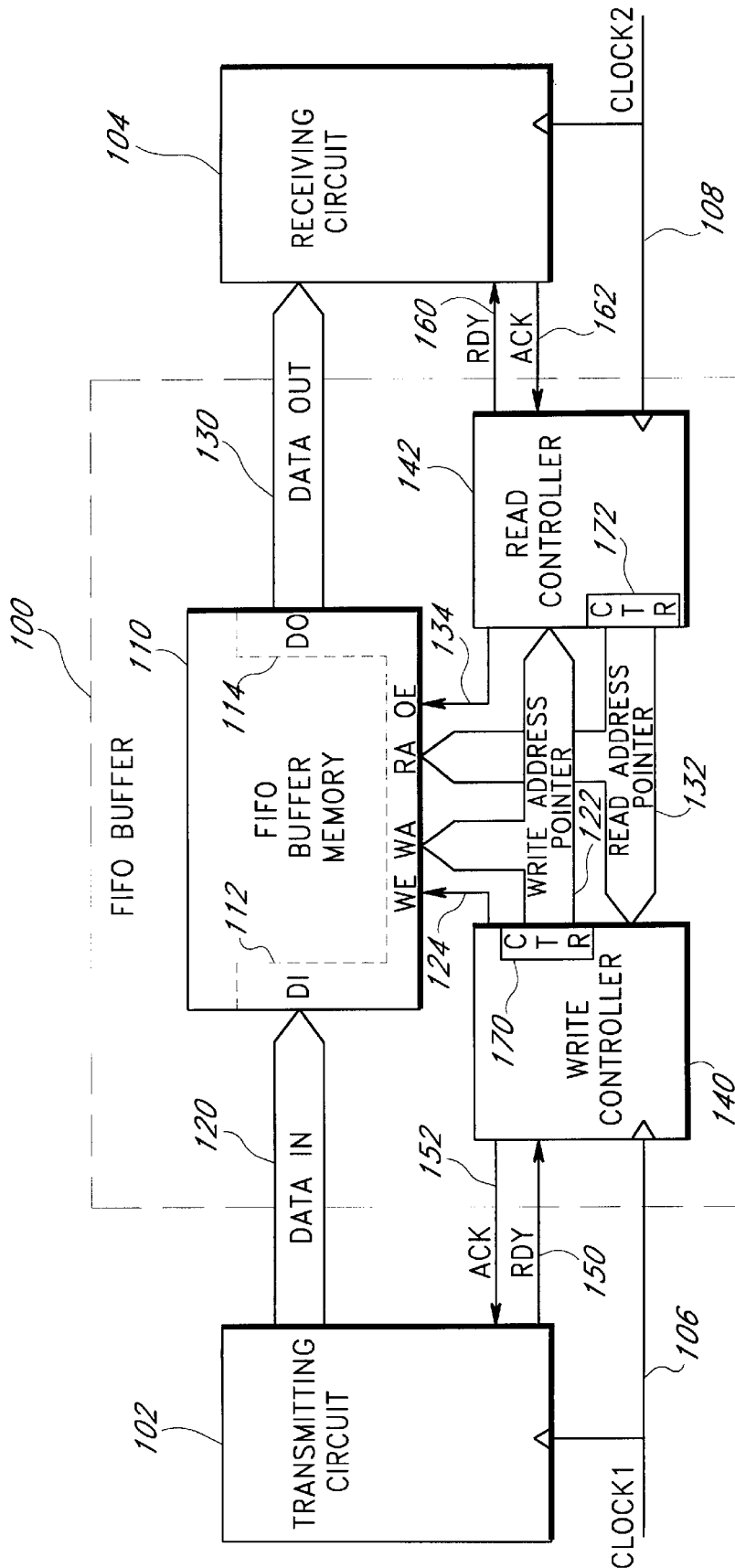
FIG. 1 illustrates a block diagram of an exemplary FIFO buffer between two digital systems which has a write controller synchronized to a first clock signal and which has a read controller synchronized to a second clock signal wherein the two clock signals are mutually asynchronous to each other.

FIG. 1 illustrates a block diagram of an exemplary FIFO (first-in/first-out) buffer 100 between a transmitting circuit 102 and a receiving circuit 104. The transmitting circuit 102 represents the data output interface of a source of digital data, such as, for example, a computer system or the like, and the receiving circuit 104 represents a data input interface of a destination for the digital data, such as, for example, a mass storage device such as a disk drive, a tape drive, or the like. It should be understood, of course, that a computer system and a mass storage device typically transfer data bidirectionally such that both the computer system and the mass storage device can operate as either a source or a destination for data. The description herein is thus not limited to a system for transferring data between a computer system and a data storage device. The present invention also can be used to control transmission of data between any data source and any data destination.

As illustrated, the transmitting circuit 102 operates in synchronism with a first clock signal (CLOCK1) on a first clock signal line 106, and the receiving circuit 104 operates in synchronism with a second clock signal (CLOCK2) on a second clock signal line 108. The two clock signals operate asynchronously with respect to each other and may have substantially different frequencies.

In addition to the differences in clock signal frequencies, the transmitting circuit 102 and the receiving circuit 104 may operate in different transfer modes. In particular, the transmitting circuit 102 may generate data at a data rate that has no fixed relationship with the rate at which the receiving circuit 104 is able to accept the data. For example, the transmitting circuit 102 may generate the data in bursts of multiple units of data while the receiving circuit 104 receives the data at a relatively constant rate, or, conversely, the transmitting circuit 102 may generate the data at a relatively constant rate while the receiving circuit 104 receives the data in bursts. As used herein, a unit of data is the amount of data which can be transmitted from the transmitting circuit 102 at one time. The unit of data (or data unit) may be, for example, a byte (eight bits), a word (two bytes), a double word (four bytes), a nibble (four bits), a single bit, or the like.

Because of differences in clock frequencies and data transfer modes, the FIFO buffer 100 is used to allow the transmitting circuit 102 to operate in synchronism with its respective clock (CLOCK1) and to transfer data using its transfer mode. The FIFO buffer 100 also allows the receiving circuit 104 to operate in synchronism with its respective clock (CLOCK2) and to transfer data using its transfer mode. Basically, the FIFO buffer 100 comprises a two-port FIFO buffer memory 110 which comprises a data input port 112 and a data output port 114. The data input port 112 comprises a data input (DI) bus 120, a write address (WA) bus 122 and a write control or write enable (WE) signal input 124. The data output port comprises a data output (DO) bus 130, a read address (RA) bus 132 and an output enable (OE) signal input 134. The data input port 112 is controlled by a write controller 140. The data output port 114 is controlled by a read controller 142.

Units of input data are provided to the data input bus 120 by the transmitting circuit 102. The transmitting circuit 102 generates an active data ready signal (RDY) on a data ready signal line 150 to the write controller 140 whenever the transmitting circuit 102 has a unit of data ready to be transferred. If the FIFO buffer memory 110 has an available data storage location, the write controller 140 applies the next available address to the write address bus 122 of the FIFO buffer memory 110 and activates the write enable signal on the signal line 124 to store the data in the addressed memory location. The write controller 140 then activates an acknowledge (ACK) signal on an acknowledge signal line 152 to indicate to the transmitting circuit 102 that the data unit has been stored in the FIFO buffer memory 110. If the transmitting circuit has additional data units to transfer, the transmitting circuit 102 again activates the ready signal on the data ready signal line 150, and the process is repeated.

If the FIFO buffer memory 110 contains a data unit to be transferred to the receiving circuit 104, the read controller 142 generates an active data ready signal (RDY) on a data ready signal line 160 to the receiving circuit 104 and activates the output enable signal on the signal line 134 to cause the data unit stored at the location addressed by the current value on the read address bus 132 to be output on the read data bus 130. The receiving circuit 104 indicates that the data unit has been accepted by activating an acknowledge signal (ACK) on an acknowledge signal line 162. If additional data units are stored in the FIFO buffer memory 110 to be transferred to the receiving circuit 104, the above-described process is repeated.

The write controller 140 includes a write address counter 170 which generates a write address pointer which keeps track of the current storage location within the FIFO buffer memory 110 to which to transfer a data unit to be stored. The write address pointer is provided to the write address input of the FIFO buffer memory 110 via the write address bus 122. Each time a data unit is stored in the FIFO buffer memory 110, the write address counter 170 is incremented to the next count value to point to the next storage location in the FIFO buffer memory 110. As discussed above, the FIFO buffer memory 110 is operated as a circular memory, and the write address counter 170 is a modulo counter having a maximum count value corresponding to the highest storage location address of the FIFO buffer memory 110 such that when the maximum count value of the write address counter 170 is reached, the next count value is a value corresponding to the lowest storage location address of the FIFO buffer memory 110.

The read controller 142 includes a read address counter 172 which generates a read address pointer which keeps track of the current storage location within the FIFO buffer memory 110 from which to transfer a data unit to be read. The read address pointer is provided to the read address input of the FIFO buffer memory 110 via the read address bus 132. Each time a data unit is read from the FIFO buffer memory 110, the read address counter 172 is incremented to the next count value to point to the next storage location in the FIFO buffer memory 110. The read address counter 172 is also a modulo counter which changes to its lowest value when incremented from its maximum value.

In addition to controlling the write address counter 170, the write controller 140 must also monitor the value of the read address counter 172 in the read controller 142. Because the rate at which data units are read from the FIFO buffer memory 110 may be considerable slower than the rate at which the data units are stored in the FIFO buffer memory 110, it is possible that the write address counter 170 can be incremented to a value that corresponds to a data storage location into which a data unit has been stored but which has not yet been transferred out to the receiving circuit 104. By monitoring the value of the read address counter 172 and comparing it to the value of the write address counter 170, the write controller 140 can determine when the next addressed data storage location in the FIFO buffer memory 110 has not been read since the last write operation. The write controller 140 will thus inhibit the acknowledge signal on the ACK line 152 so that the data transfer from the transmitting circuit 102 is not acknowledged until the value of the read address counter 172 is incremented and the data storage location becomes available.

Similarly, by monitoring the value of the write address counter 170 and comparing it to the value of the read address counter 172, the read controller 142 can determine when it has transferred all the data units currently stored in the FIFO buffer memory 110 and will stop transferring data to the receiving circuit 104 until the write address counter 170 is again incremented to indicate that a new data unit has been stored in the FIFO buffer memory 110. A number of different comparison systems can be used by the write control circuit 140 and the read control circuit 142. Detailed descriptions of the comparison circuits in the write address controller 140 and the read address controller 142 are not necessary to the understanding of the present invention which will be described in detail below.

As set forth above, it is necessary for the write address controller 140 to monitor the output of the read address counter 172 in order to avoid overwriting unread data units in data storage locations, and it is necessary for the read address controller 142 to monitor the output of the write address counter 170 to avoid reading data units from data storage locations from which the data units have already been transferred. Because the write address controller 140 and the read address controller 142 are operating in synchronism with mutually asynchronous clock signals (CLOCK1 and CLOCK2, respectively), the write address counter 170 may be updated at unpredictable times with respect to the phases of the CLOCK2 signal which controls the read address controller 142. Similarly, the read address counter 172 may be updated at unpredictable times with respect to the phases of the CLOCK1 signal which controls the operation of the write address controller 140. Thus, for example, if the write address controller 140 simply latches the output of the read address counter 172 in synchronism with CLOCK1, the latching operation may occur just as the read address counter 172 is being incremented. As one skilled in the art will appreciate, because of variations in the switching times of the data bits comprising the multiple-bit count value of the read address counter 172, the results of such a latching operation will often result in a value that does not correspond to either the value before the read address counter 172 was incremented or the value after the read address counter 172 was incremented. For example, if the read address counter 172 comprises eight bits which increment from all zeros (i.e., 00000000) to all ones (i.e., 11111111) and then change back to all zeros when the next increment operation occurs, during a relatively short transition time when the count value changes from all ones to all zeros, some of the ones will change to zeros before others of the ones change to zeros. If the write controller 140 latches the read address pointer output of the read address counter 172 during this transition time, the actual value latched by the write controller 140 is unpredictable. A similar unpredictable result could occur if the write address pointer value is latched by the read controller 142 when the write address counter 170 is being incremented.

Figure 2:
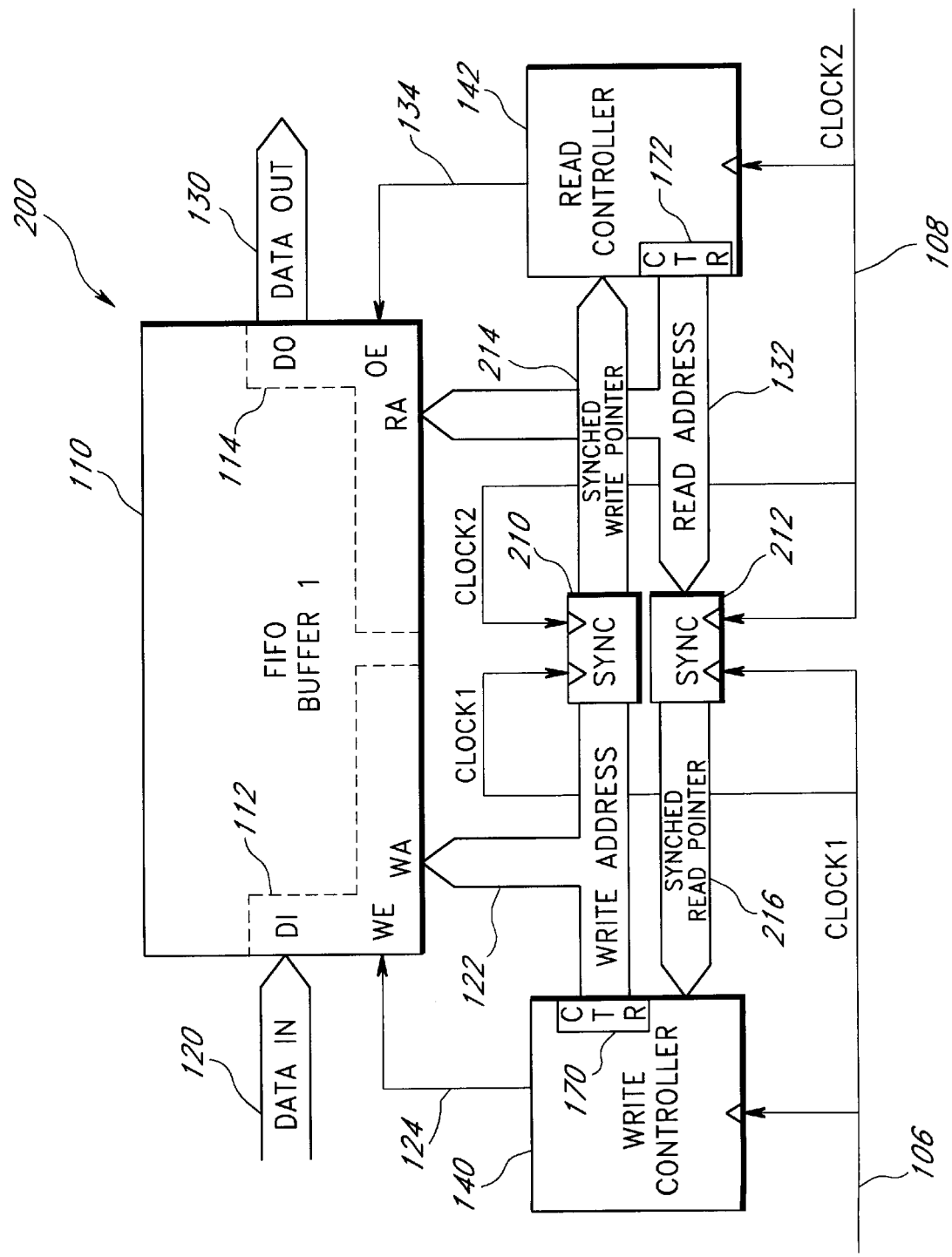
FIG. 2 illustrates a block diagram of the write controller and the read controller of FIG. 1 which incorporate synchronization circuits in accordance with the present invention between the write controller and the read controller.

The present invention, illustrated in FIGS. 2–6, solves the above-described problem by assuring that the write address pointer and the read address pointer are stable when evaluated by the controller which receives the respective pointer from the counter which generates the pointer. As illustrated in FIG. 2, an improved FIFO buffer 200 in accordance with the present invention includes a first synchronization circuit 210 between the output of the write address counter 170 and the read controller 142 and includes a second synchronization circuit 212 between the output of the read address counter 172 and the write controller 140. The first synchronization circuit 210 generates a synchronized write address pointer (SYNCHED WRITE POINTER) on a synchronized write pointer bus 214 which is provided as an input to the read controller 142. The synchronized write address pointer on the bus 214 is synchronized with the CLOCK2 signal to assure that the write address value evaluated by the read controller 142 does not change when the comparison is being performed by the read controller 142.

The second synchronization circuit 212 generates a synchronized read address pointer (SYNCHED READ POINTER) on a synchronized read pointer bus 216 which is provided as an input to the write controller 140. The synchronized read address pointer on the bus 216 is synchronized with the CLOCK1 signal to assure that the read address value evaluated by the write controller 140 does not change when the comparison is being performed by the write controller 142.

By synchronizing the write address value and the read address value, as described herein, the possibility of either the write address controller 140 or the read address controller 142 evaluating an incorrect value is thereby eliminated.

Figure 3:
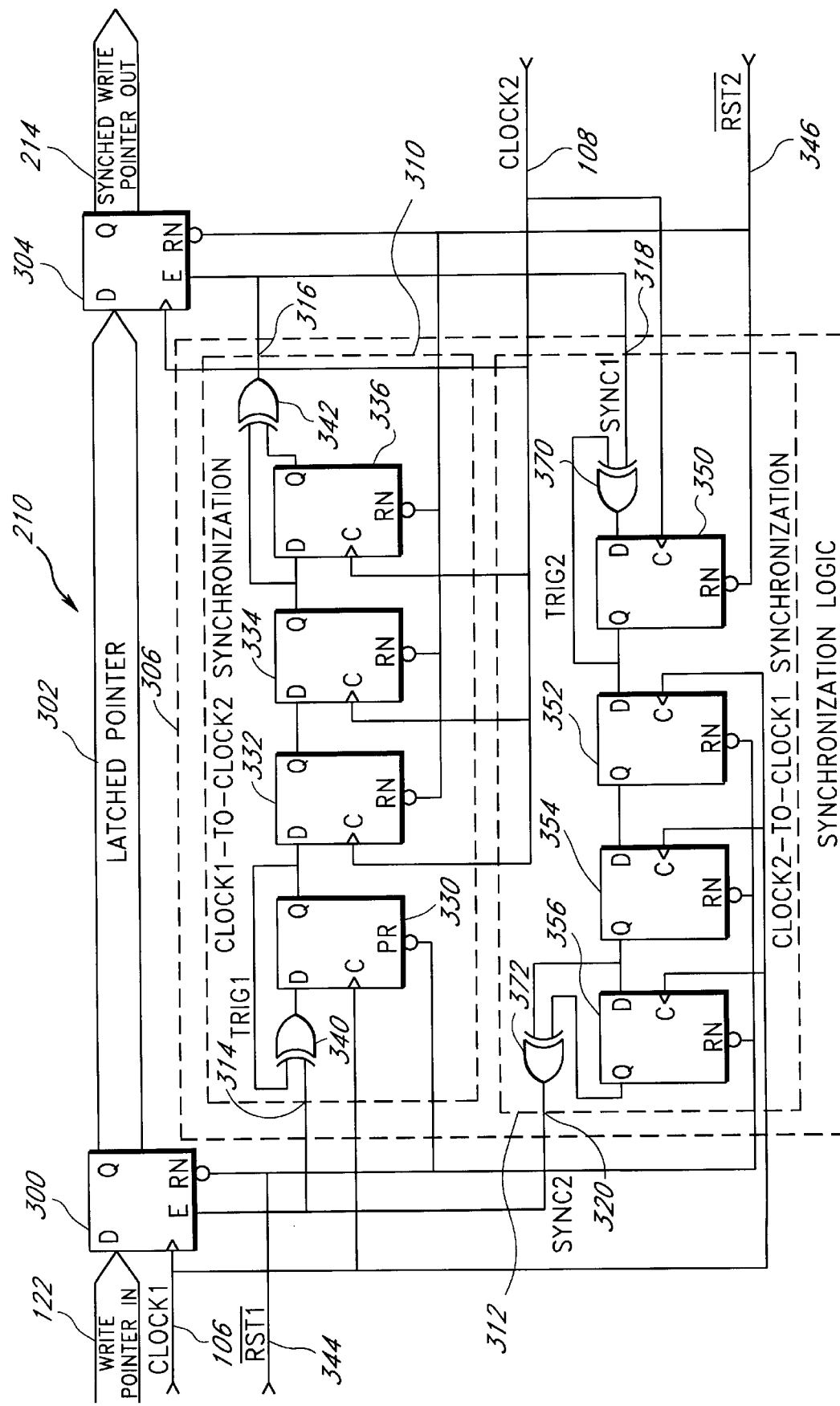
FIG. 3 illustrates a logic diagram of the synchronization circuit in accordance with the present invention which synchronizes the transfer of the pointer values between the write address controller and the read address controller in FIG. 2.
Figure 4:
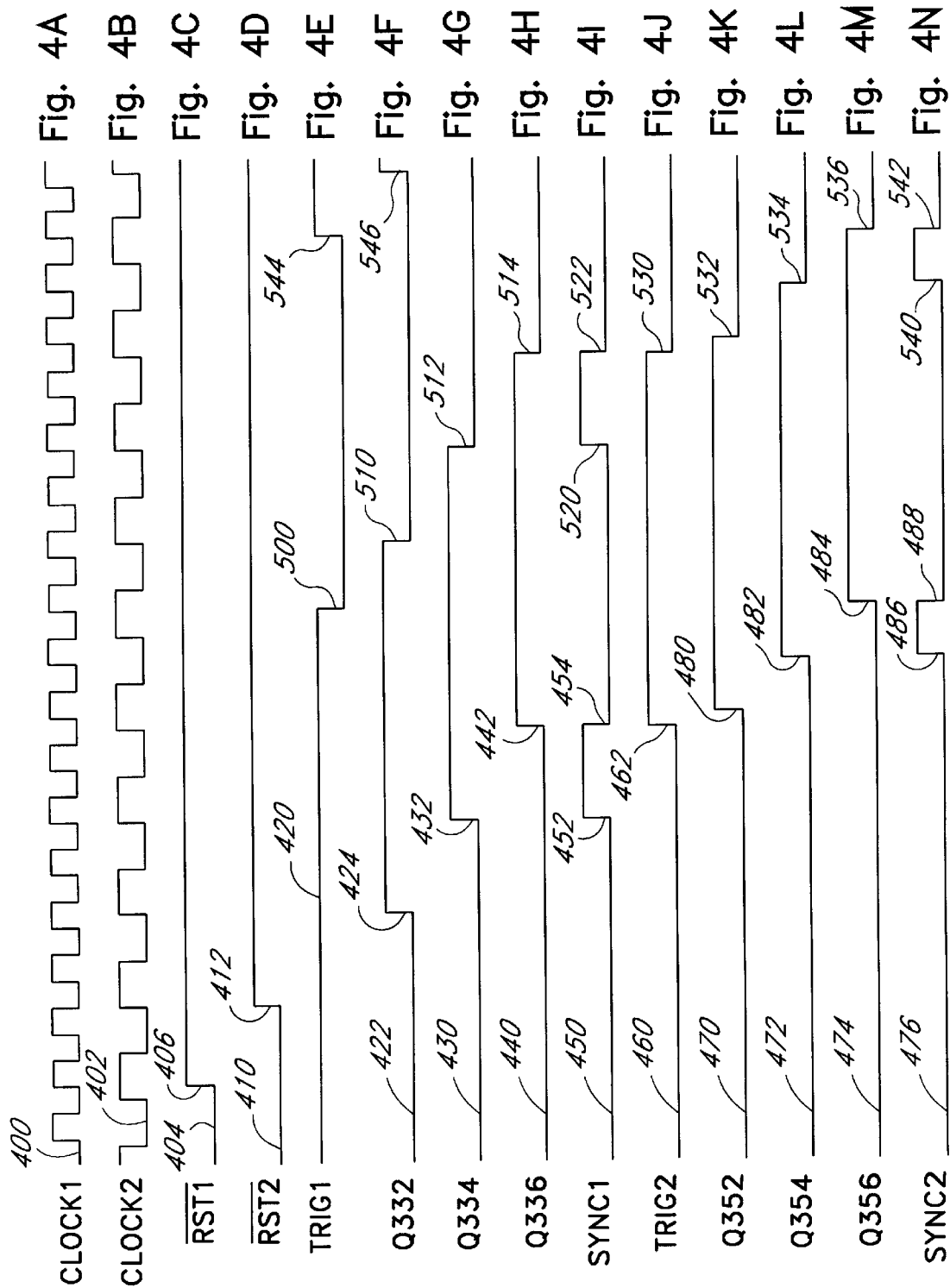
FIG. 4 (comprising FIGS. 4A–4N) illustrates timing diagrams for the synchronization circuit of FIG. 3.
Figure 5:
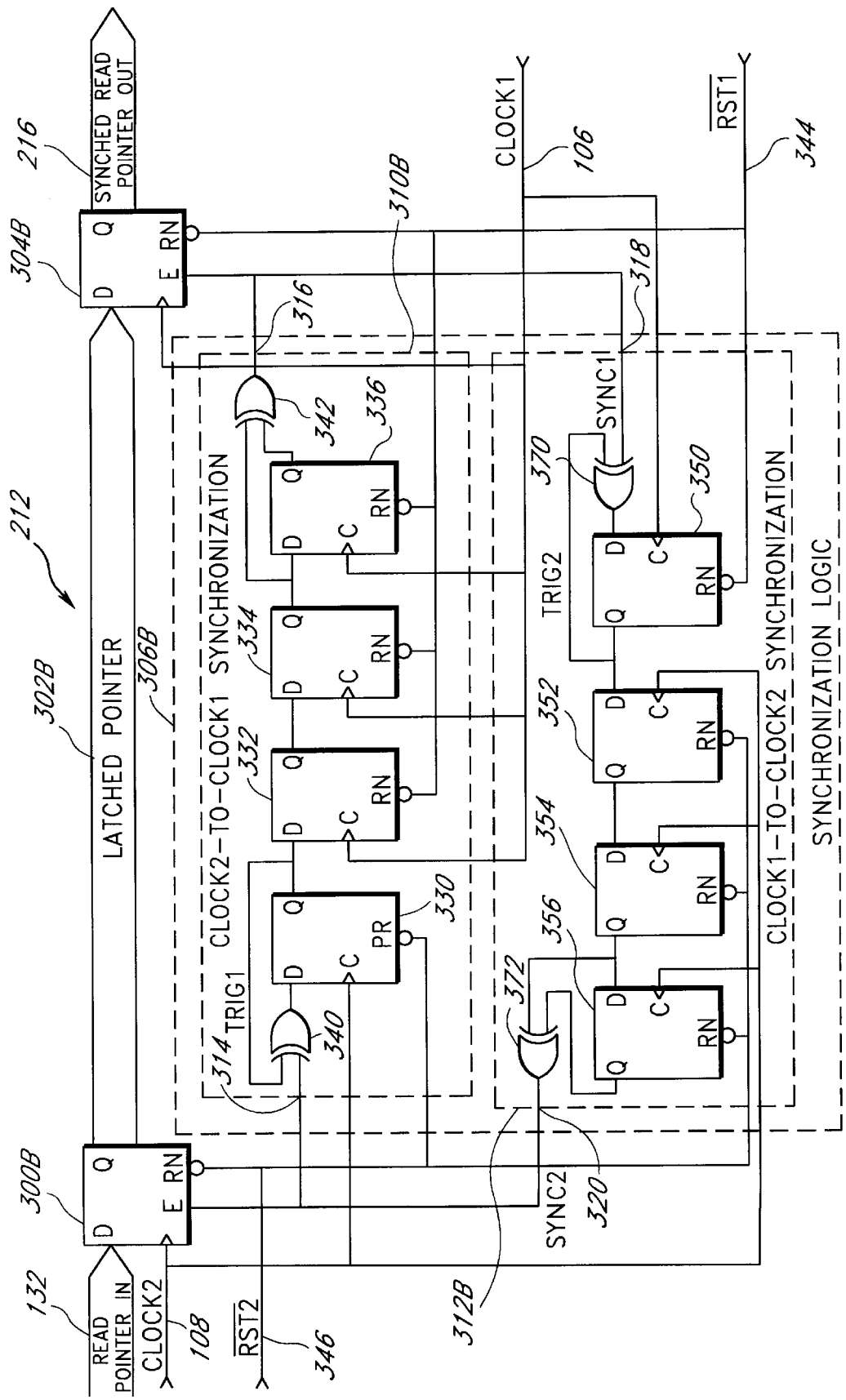
FIG. 5 illustrates a logic diagram of the synchronization circuit in accordance with the present invention which synchronizes the transfer of the pointer values between the read address controller and the write address controller in FIG. 2.
Figure 6:
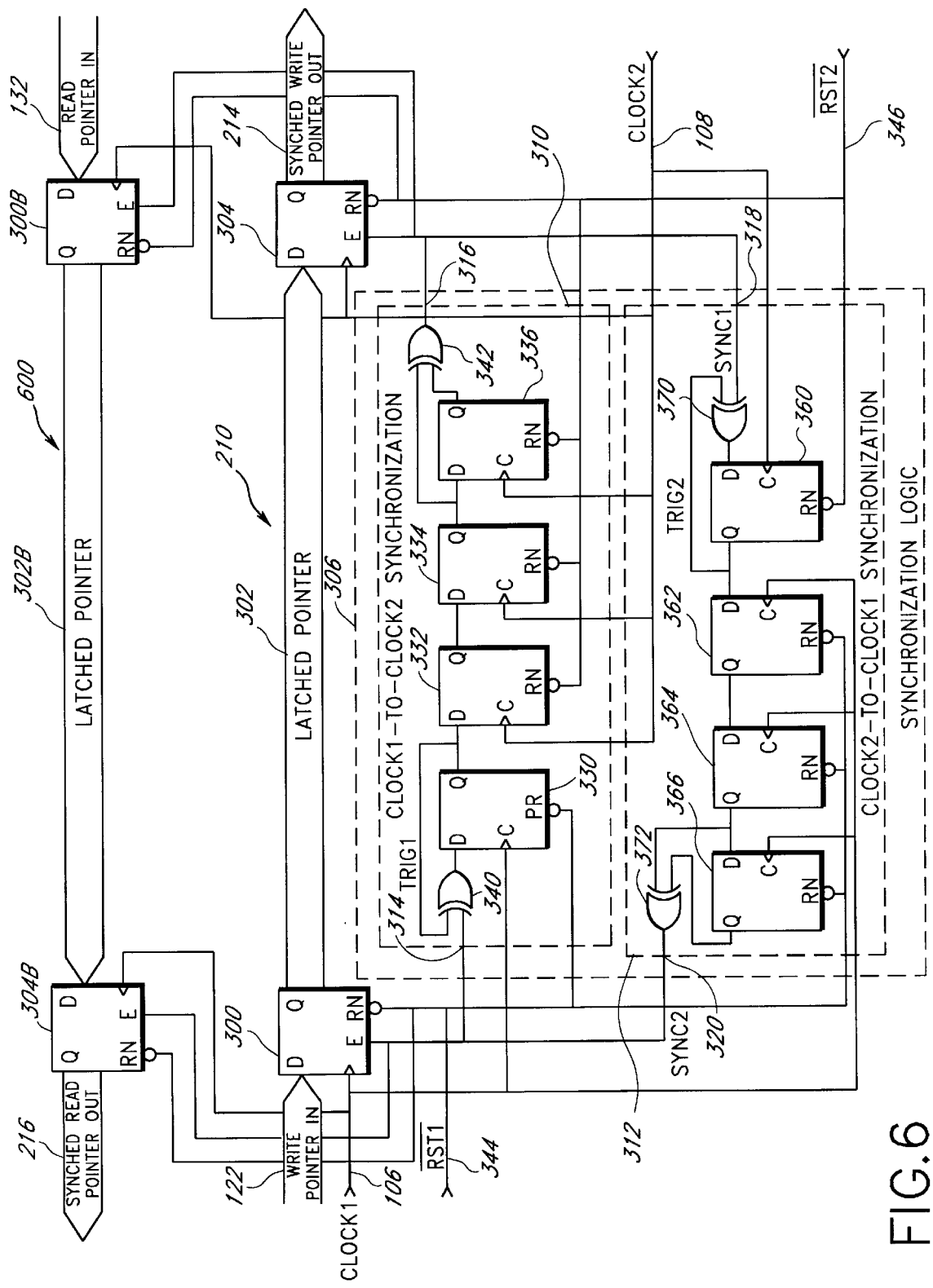
FIG. 6 illustrates a logic diagram of an alternative synchronization circuit in which a single synchronization logic circuit synchronizes the transfer of the pointer values between the write address controller and the read address controller and also synchronizes the transfer of pointer values between the read address controller and the write address controller.

A detailed block diagram of the first synchronization circuit 210 is illustrated in FIG. 3. The second synchronization circuit 212, which is substantially similar to the first synchronization circuit 210, is illustrated in FIG. 5. An alternative synchronization circuit 216 which combines common elements of the first and second synchronization circuits is illustrated in FIG. 6.

An important feature of the synchronization circuits described herein is that either clock (CLOCK1 or CLOCK2) can have a higher frequency than the other clock. Thus, the synchronization circuits can be used even if it is not known in advance that one clock will always have a higher frequency.

The operation of the synchronization circuits in accordance with the present invention will be described first in connection with the first synchronization circuit 210 in FIG. 3. As illustrated in FIG. 3, the first synchronization circuit 210 comprises an input latch 300 which is a multiple-bit input latch which receives and latches the write address pointer (POINTER IN) generated by the write address counter 170 (FIG. 2) on the bus 122. That is, the input latch 300 provides a temporary data storage location for each bit of the write address pointer. The output of the input latch 300 is a multiple-bit signal LATCHED POINTER on a latched pointer bus 302. The LATCHED POINTER signal on the bus 302 is provided as an input to an output latch 304 which latches the LATCHED POINTER signal and provides a multiple-bit SYNCHED POINTER OUT signal on the synchronized write address bus 214. The input latch 300 and the output latch 304 are controlled by synchronization logic 306 described below.

The input latch 300 and the output latch 304 are latched registers. That is, data bits provided to the respective data (D) inputs of the latches are passed through the latches and appear at the outputs (Q) of the latches when a respective latch enable signal on a respective latch enable (E) input is active. When the latch enable signal becomes inactive, the data bits at the data inputs at the time the latch enable signal becomes inactive are latched at the outputs of the respective latch 300, 304 and the output signals do not change irrespective of changes in the signals applied to the inputs of the latches. As illustrated in FIG. 3, the input latch enable signal applied to the input latch 300 is clocked in synchronism with the CLOCK1 signal on the first clock signal line 106 to latch the write address pointer into the input latch 300 when the write address pointer is assured to be stable. Similarly, the output latch enable signal applied to the output latch 304 is clocked in synchronism with the CLOCK2 signal on the second clock signal line 108 to assure that the SYNCHED POINTER OUT signal on the bus 214 is stable when compared to the read address pointer which is generated in synchronism with the CLOCK2 signal. As described below, the synchronization logic 306 operates to control the generation of the input latch enable signal and the output latch enable signal to assure that the data bits of the LATCHED POINTER signal on the bus 302 do not change when the output latch enable signal is active.

In accordance with the preferred embodiment of the present invention, the synchronization logic 306 comprises a clock1-to-clock2 synchronization section 310 and a clock2-to-clock1 synchronization section 312. The clock1-to-clock2 synchronization section 310 has an input 314 and an output 316. The clock2-to-clock1 synchronization section 312 has an input 318 and an output 320. The output 316 of the clock1-to-clock2 synchronization section 310 generates a signal SYNC 1 which is provided to the input 318 of the clock2-to-clock1 synchronization section 312. The SYNC1 signal is also provided to the enable (E) input of the output latch 304. The output 320 of the clock2-to-clock1 synchronization section 312 generates a signal SYNC2 which is provided to the input 314 of the clock1-to-clock2 synchronization section 310. The SYNC2 signal is also provided to the enable (E) input of the input latch 300. Both the clock1-to-clock2 synchronization section 310 and the clock2-to-clock1 synchronization section 312 receive the CLOCK1 signal and the CLOCK2 signal.

The clock1-to-clock2 synchronization section 310 comprises a first D flip-flop 330, a second D flip-flop 332, a third D flip-flop 334 and a fourth D flip-flop 336. The clock1-to-clock2 synchronization circuit further includes a first two-input exclusive-OR gate 340 and a second two-input exclusive-OR gate 342. Each of the D flip-flops 330, 332, 334, 336 has a respective data (D) input, a respective clock (C) input and a respective data (Q) output. The D flip-flops 330, 332, 334, 336 are edge-triggered flip-flops such that the data at the D input is transferred to the Q output when a clock signal applied to the clock (C) input transitions from one logic level to another logic level. Logic levels at the D input at times other than the specified edge (i.e., the specified transition) are ignored. In the embodiment illustrated in FIG. 3, all the D flip-flops are positive edge triggered flip-flops such that the logic level on the D input is transferred in response to a transition of the clock signal from a low logic level to a high logic level. Transitions of the clock signal from a high logic level to a low logic level have no effect.

The clock input of the first flip-flop 330 receives the CLOCK1 signal and is thus synchronized with the transmitting circuit 102. The clock inputs of the second, third and fourth flip-flops 332, 334, 336 receive the CLOCK2 signal and are thus synchronized with the receiving circuit 104.

A first input of the first exclusive-OR gate 340 is connected to the input 314 of the clock1-to-clock2 synchronization section 310 and thus receives the SYNC2 signal from the clock2-to-clock1 synchronization section 312. A second input of the first exclusive-OR gate 340 is connected to the Q output of the first flip-flop 330. The signal generated by the Q output of the first flip-flop 330 is referred to herein as TRIG1. The output of the first exclusive-OR gate 340 is connected to the D input of the first flip-flop 330. The Q output of the first flip-flop 330 is also connected to the D input of the second flip-flop 332. The Q output of the second flip-flop 332 is connected to the D input of the third flip-flop 334. The Q output of the third flip-flop 334 is connected to the D input of the fourth flip-flop 334 and to a first input of the second exclusive-OR gate 342. The Q output of the fourth flip-flop 336 is connected to a second input of the second exclusive-OR gate 342. The output of the second exclusive-OR gate 342 is the SYNC1 signal which is provided on the output 316 of the clock1-to-clock2 synchronization section 310 and which is connected to the enable (E) input of the output latch 304 and to the input 318 of the clock2-to-clock1 synchronization section 312.

The first D flip-flop 330 further includes a preset (PR) input which, in the illustrated embodiment, receives an active low reset ($\overline{\text{RST1}}$) signal on a first reset bus 344. The $\overline{\text{RST1}}$ signal is synchronized with the CLOCK1 signal. When the $\overline{\text{RST1}}$ signal is active low, the Q output of the first D flip-flop 330 is forced to a high (i.e., logic 1) level irrespective of the logic level on the D input. The second, third and fourth D flip-flops 332, 334, 336 further include respective reset (RN) inputs which receive an active low reset ($\overline{\text{RST2}}$) signal on a second reset bus 346. The $\overline{\text{RST2}}$ signal is synchronized with the CLOCK2 signal. Unlike the Q output of the first flip-flop 330, the respective Q outputs of the second, third and fourth flip-flops 332, 334, 336 are reset to a low logic level when the $\overline{\text{RST2}}$ signal is active. Thus, assuming both reset signals are active, the Q output of the first flip-flop 330 will be at a logical 1 level and the Q outputs of the second, third and fourth flip-flops 332, 334, 336 will all be at a logical 0 level.

The clock2-to-clock1 synchronization section 312 is similar to the clock1-to-clock2synchronization section 310. In particular, the clock2-to-clock1 synchronization section 312 comprises a fifth D flip-flop 350, a sixth D flip-flop 352, a seventh D flip-flop 354 and an eighth D flip-flop 356. The clock1-to-clock2 synchronization section 312 further includes a third two-input exclusive-OR gate 370 and a fourth two-input exclusive-OR gate 372. Each of the D flip-flops 350, 352, 354, 356 has a respective data (D) input, a respective clock (C) input and a respective data (Q) output. The D flip-flops 350, 352, 354, 356 are positive edge-triggered flip-flops which operate as described above.

The clock input of the fifth flip-flop 350 receives the CLOCK2 signal and is thus synchronized with the receiving circuit 104. The clock inputs of the sixth, seventh and eighth flip-flops 352, 354, 356 receive the CLOCK1 signal and are thus synchronized with the transmitting circuit 102.

A first input of the third exclusive-OR gate 370 is connected to the input 318 of the clock2-to-clock1 synchronization section 312 and thus receives the SYNC1 signal from the clock1-to-clock2 synchronization section 310. A second input of the third exclusive-OR gate 370 is connected to the Q output of the fifth flip-flop 350. The signal generated by the Q output of the fifth flip-flop 350 is referred to herein as TRIG2. The output of the third exclusive-OR gate 370 is connected to the D input of the fifth flip-flop 350. The Q output of the fifth flip-flop 350 is also connected to the D input of the sixth flip-flop 352. The Q output of the sixth flip-flop 352 is connected to the D input of the seventh flip-flop 354. The Q output of the seventh flip-flop 354 is connected to the D input of the eighth flip-flop 356 and to a first input of the fourth exclusive-OR gate 372. The Q output of the eighth flip-flop 356 is connected to a second input of the fourth exclusive-OR gate 372. The output of the fourth exclusive-OR gate 372 is the SYNC2 signal which is provided on the output 320 of the clock2-to-clock1 synchronization section 312 and which is connected to the enable (E) input of the input latch 302 and to the input 314 of the clock1-to-clock2 synchronization section 310.

The fifth D flip-flop 350 further includes a reset (RN) input which, in the illustrated embodiment, receives the active low reset ($\overline{\text{RST2}}$) signal on the second reset bus 346. When the $\overline{\text{RST2}}$ signal is active low, the Q output of the fifth D flip-flop 350 is forced to a low (i.e., logic 0) level irrespective of the logic level on the D input. The sixth, seventh and eighth D flip-flops 352, 354, 356 further include respective reset (RN) inputs which receive the active low reset ($\overline{\text{RST1}}$) signal on the first reset bus 344. Thus, the Q outputs of the fifth, sixth, seventh and eighth flip-flops 350, 352, 354, 356 are all reset to a low logic level when the $\overline{\text{RST1}}$ and $\overline{\text{RST2}}$ signals is active. Note that only the Q output of the first flip-flop 330 in the clock1to-clock2synchronization section 310 is preset to an active high logic level. None of the flip-flops 350, 352, 254, 356 in the clock2-to-clock1 synchronization section 312 are preset to an active high logic level.

The operation of the synchronization logic 306 is illustrated by the timing diagrams in FIGS. 4A–4N. FIG. 4A illustrates a timing waveform 400 for the CLOCK1 signal. FIG. 4B illustrates a timing waveform 402 for the CLOCK2 signal. In the example presented herein, the CLOCK2 signal has a lower frequency than the CLOCK1 signal and is asynchronous with the CLOCK1 signal.

FIG. 4C illustrates a timing waveform 404 for the first reset signal $\overline{\text{RST1}}$. The first reset signal is initially at an active low logic level to preset the Q output of the first flip-flop 330 to a logical one and to reset the sixth, seventh and eighth flip-flops 352, 354, 356 to logical zeros. The first reset signal changes to an inactive high level via a low-to-high transition 406 which is preferably synchronized with the CLOCK1 signal.

FIG. 4D illustrates a timing waveform 410 for the second reset signal $\overline{\text{RST2}}$. The second reset signal is initially at an active low logic level to reset the Q outputs of the second, third, fourth and fifth flip-flops 332, 334, 336, 350 to logical zeros. The second reset signal changes to an inactive high level via a low-to-high transition 412 which is preferably synchronized with the CLOCK2 signal.

FIG. 4E illustrates a timing waveform 420 for the first trigger signal (TRIG1) which corresponds to the Q output of the first flip-flop 330. As illustrated, the TRIG1 signal is preset to a logical one by the first reset signal and remains at a logical one until changed by the SYNC2 signal as will be described below. In particular, the TRIG1 signal at the beginning of each cycle of the CLOCK1 signal corresponds to the exclusive-OR of the TRIG1 signal and the SYNC2 signal (shown in FIG. 4N). Because, as will be discussed below, the SYNC2 signal is reset to a logical zero and because the TRIG1 signal is reset to a logical one, the output of the first exclusive-OR gate 340 will be a constant logical one until the SYNC2 signal changes.

FIG. 4F illustrates a timing waveform 422 for the Q output of the second flip-flop 332 and is identified as Q332. As illustrated, the Q332 signal is initially reset to a logical zero by the second reset signal and remains at a logical zero until the second reset signal becomes inactive. As discussed above, the second reset signal preferably changes from its active low state to its active high state in synchronism with the CLOCK2 signal. Thus, on the next low-to-high transition (i.e., positive edge) of the CLOCK2 signal following the release of the second reset signal, the logic level at the data input of the second flip-flop 332 will be transferred to the Q output of the second flip-flop 332 as the Q332 signal. Because the data input to the second flip-flop 332 is the TRIG1 signal which has a logical one level, the Q332 signal makes a low-to-high transition 424. As illustrated, the Q332 signal remains at a logical one level until the TRIG1 signal changes in accordance with the following description.

FIG. 4G illustrates a timing waveform 430 for the Q output of the third flip-flop 334 and is identified as Q334. As illustrated, the Q334 signal is initially reset to a logical zero by the second reset signal. The Q334 signal remains at a logical zero until one CLOCK2 cycle after the transition 424 of the Q332 signal. Thus, on the next positive edge of the CLOCK2 signal following the low-to-high transition 424 of the Q332 signal, the Q334 signal makes a low-to-high transition 432. The Q334 signal remains at a logical one until one CLOCK2 cycle after the Q332 signal next changes, as described below.

FIG. 4H illustrates a timing waveform 440 for the Q output of the fourth flip-flop 336 and is identified as Q336. As illustrated, the Q336 signal is initially reset to a logical zero by the second reset signal and remains at a logical zero one CLOCK2 cycle after the transition 432 of the Q334 signal. Thus, on the next positive edge of the CLOCK2 signal following the transition 432 of the Q334 signal, the Q336 signal makes a low-to-high transition 442. The Q336 signal remains at a logical one until one clock cycle after the Q334 signal next changes, as described below.

FIG. 4I illustrates a timing waveform 450 for the SYNC1 signal on the output of the second exclusive-OR gate 342. The SYNC1 signal is the exclusive-OR of the Q334 signal and the Q336 signal. Thus, the SYNC1 signal makes an low-to-high transition 452 when the Q334 signal makes the transition 432 such that the Q334 signal and the Q336 signal have different logic levels. The SYNC1 signal then makes a high-to-low transition 454 when the Q336 signal makes the transition 442 on the next positive edge of the CLOCK2 signal and the Q334 signal and the Q336 signal again have the same logic level. Thus, the SYNC1 signal makes a low-to-high-to-low sequence in one cycle of the CLOCK2 signal. As illustrated in FIG. 3, the SYNC1 signal enables the output latch 304 when the SYNC1 signal has a high logic level. Thus, the pointer data on the latched pointer bus 302 pass through the output latch 304 to the output bus 214 during the time interval between the transition 452 and the transition 454. After the transition 454, the pointer data remain latched in the output latch 304 and are thus stable on the output bus 214 until the SYNC1 signal again makes a low-to-high transition, as discussed below.

FIG. 4J illustrates a timing waveform 460 for the TRIG2 signal on the Q output of the fifth flip-flop 350. The SYNC1 signal and the TRIG2 signal are both provided as inputs to the third exclusive-OR gate 370. The output of the third exclusive-OR gate 370 is the data input to the fifth flip-flop 350. Thus, on each positive edge of the CLOCK2 signal, the new value for the TRIG2 signal is the exclusive-OR of the previous value of the TRIG2 signal and the previous value of the SYNC1 signal. Thus, when the SYNC1 signal has the positive transition 452 on the positive edge of a cycle of the CLOCK2 signal, the output of the third exclusive-OR gate 370 will switch to a logical one because the SYNC1 signal has a different logic level than the TRIG2 signal. Thus, on the positive edge of the next cycle of the CLOCK2 signal, the TRIG2 signal makes a low-to-high transition 462 as the SYNC1 signal makes the high-to-low transition 454. Thus, on the next positive edge of the CLOCK2 signal, the SYNC1 signal and the TRIG2 signal again have mutually different logic levels, and the TRIG2 signal remains at a logic one level. Thus, because the SYNC1 signal remains at a high logic level for only one cycle of the CLOCK2 signal, the TRIG2 signal changes logic levels at the same time that the SYNC1 signal switches back to the low logic level. The TRIG2 signal then remains at the new logic level until the end of the next low-to-high-to-low sequence of the SYNC1 signal.

The operation of the clock2-to-clock1 synchronization section 312 is illustrated by a Q352 waveform 470 in FIG. 4K, a Q354 waveform 472 in FIG. 4L, a Q356 waveform 474 in FIG. 4M and a SYNC2 waveform 476 in FIG. 4N. The clock2-to-clock1 synchronization section 312 operates in a similar manner to the clock1-to-clock2 synchronization section 310 as described above. The high logic level which results from the low-to-high transition 462 of the TRIG2 signal (which occurs in the CLOCK2 clock domain) is detected at the data input of the sixth flip-flop 352 on the next positive edge of the CLOCK1 signal to cause a low-to-high transition 480 of the Q352 signal. The resulting high logic level of the Q352 signal causes a low-to-high transition 482 of the Q354 signal on the next positive edge of the CLOCK1 signal. The resulting high logic level of the Q354 signal causes a low-to-high transition 484 of the Q356 signal on the next positive edge of the CLOCK1 signal. The Q354 signal and the Q356 signal are provided as the two inputs to the fourth exclusive-OR gate 372. Initially, both signals are at logical zero levels. Thus, because both input signals to the fourth exclusive-OR gate 372 are at the same logic level, the SYNC2 signal 476 generated on the output of the fourth exclusive-OR gate 370 is a logical zero. When the Q354 signal makes the low-to-high transition 482, the Q354 signal is at a different logic level for one cycle of the CLOCK1 signal until the Q356 signal makes the low-to-high transition 484 and also becomes a logical one. Thus, the SYNC2 output of the fourth exclusive-OR gate 372 makes a low-to-high transition 486 in response to the low-to-high transition 482 of the Q354 signal and remains at a logical one for one clock cycle while the two signals have different logic levels and then returns to a logical zero via a high-to-low transition 488 in response to the low-to-high transition 484 of the Q356 signal when both the Q354 signal and the Q356 signal again have the same logic level. When the SYNC2 signal is at a logical high level between the transition 486 and the transition 488, the POINTER IN data on the input data bus 122 at the input of the input latch 300 are propagated through the input latch 300 to the output of the input latch 300 and thus to the latched pointer bus 302. When the SYNC2 signal makes the transition 488 back to the low logic level, the data on the output of the input latch 300 are latched such that further changes to the data on POINTER IN data bus 122 have no effect on the output data.

The high logic level on the SYNC2 signal is provided to the input of the first exclusive-OR gate 340. Because the other input of the exclusive-OR gate 340 is the TRIG1 signal, which, as shown in FIG. 4E, is also at a high logic level, the output of the first exclusive-OR gate 340 switches to a low logic level. Thus, on the next positive edge of the CLOCK1 signal, the TRIG1 signal on the Q output of the first flip-flop 350 makes a high-to-low transition 500 to a low logic level. At the same time, the SYNC2 signal has also made the high-to-low transition 488. Thus, because the logic levels of both inputs to the first exclusive-OR gate 340 are equal to each other, the output of the first exclusive-OR gate 340 remains at a low logic level after the transitions 488, 500.

The low logic level of the TRIG1 signal causes the Q332 signal to make a high-to-low transition 510 on the next positive edge of the CLOCK2 signal. The Q334 signal makes a high-to-low transition 512 on the next positive edge of the CLOCK2 signal. The Q336 signal makes a high-to-low transition 514 on the next positive edge of the CLOCK2 signal.

During the time between the transition 512 of the Q334 signal and the transition 514 of the Q336 signal, the two inputs of the second exclusive-OR gate 342 are again different causing the SYNC1 output of the second exclusive- OR gate 342 to make a low-to-high transition 520 to a logical one. After the transition 514 of the Q336 signal, the two inputs of the second exclusive-OR gate 342 have the same logic level and the output of the second exclusive-OR gate 342 makes a high-to-low transition 522 to a logical zero.

The active high SYNC1 signal causes the output latch 304 to gate the latched pointer data on the LATCHED POINTER bus 302 through to the SYNCHED POINTER OUT bus 214. Thus, the pointer data which were gated onto the LATCHED POINTER bus 302 from the POINTER IN bus 122 in synchronism with the CLOCK1 signal are gated out to the SYNCHED POINTER OUT bus 214 in synchronism with the CLOCK2 signal. Because the pointer data are gated onto the LATCHED POINTER bus 302 in synchronism with the CLOCK1 signal from the transmitting circuit 102, there is no possibility that the data can be unstable when gated onto the bus 302. Similarly, because the pointer data are gated from the bus 302 to the receiving circuit 104 in synchronism with the CLOCK2 signal which controls the receiving circuit 104, there is no possibility that the data transferred to the receiving circuit are unstable. It should be further noted that the data are guaranteed to be stable on the LATCHED POINTER bus 302 before the output latch 304 gates the data from the bus 302 because the second flip-flop 332 imposes at least one full cycle of the CLOCK2 signal before the SYNC2 signal enables the output latch 304.

The second flip-flop 332 further operates to preclude any metastability condition from causing glitches in the SYNC1 signal. One skilled in the art will appreciate that the second flip-flop 332 receives the TRIG1 signal which changes in synchronism with the CLOCK1 signal. However, the second flip-flop 332 is clocked by the CLOCK2 signal, which is asynchronous to the CLOCK1 signal. Thus, it is possible that the TRIG1 signal will change (i.e., have a transition) at approximately the same time that the TRIG1 signal is clocked into the second flip-flop 332. If the TRIG1 signal does not satisfy at least the minimum setup and hold timing requirements of the second flip-flop 332, the Q output of the second flip-flop 332 may exhibit a metastable condition. That is, the Q output may oscillate between its two possible logic levels for a short interval before stabilizing in one of the logic levels. If the metastable signal were to be applied to the second exclusive-OR gate 342, it is possible to generate multiple active high SYNC1 signals rather than one single pulse as illustrated in FIG. 4I. The metastable condition will end within one cycle of the CLOCK2 signal, and thus the Q332 signal presented to the data input of the third flip-flop 334 at the time of the next positive edge of the CLOCK2 signal will be stable and the Q334 signal on the output of the third flip-flop 334 will likewise be stable. Note that if the metastable condition terminates with the Q332 signal at a logic level different than the logic level of the TRIG1 signal, the TRIG1 signal will be guaranteed to satisfy the setup and hold times of the second flip-flop 332 on the next positive edge of the CLOCK2 signal. If this event occurs, the only effect of the metastable condition is to add a delay equivalent to an extra cycle of the CLOCK2 signal before the Q334 signal makes the transition 512 (or the transition 432 described above).

The SYNC1 signal between the low-to-high transition 520 and the high-to-low transition 522 is provided to the third exclusive-OR gate 370 as discussed above; however, because the TRIG2 signal is at a high logic level this time, the two high logic levels causes the output of the third exclusive-OR 370 to transition to a logic zero, and thus, on the next positive edge of the CLOCK2 signal, the TRIG2 signal will make a high-to-low transition 530. The TRIG2 signal will then remain at the low logic level because the SYNC1 signal will also be at a low logic level on the next positive edge of the CLOCK2 signal.

On the first positive edge of the CLOCK1 signal following the transition 530 of the TRIG2 signal, the Q352 signal makes a high-to-low transition 532. Then, on the next positive transition of the CLOCK1 signal, the Q354 signal makes a low-to-high transition 534 (or, if a temporary metastable condition occurs, the transition 534 will be delayed by an additional cycle of the CLOCK1 signal). On the next positive edge of the CLOCK1 signal following the transition 534, the Q356 signal will make a high-to-low transition 536. The Q354 signal and the Q356 signal have different logic levels between the transition 534 of the Q354 signal and the transition 536 of the Q356 signal. Thus, the TRIG2 signal on the output of the fourth exclusive-OR gate 372 will make a low-to-high transition 540 in response to the transition 534 and will make a high-to-low transition 542 in response to the transition 536. Thus, the SYNC2 signal will again be active for one cycle of the CLOCK2 signal to gate the current value on the POINTER IN bus 122 through the input latch 300 to the LATCHED POINTER bus 302. The SYNC2 signal causes the TRIG1 signal to make a low-to-high transition 544 on the next positive transition of the CLOCK1 signal, and the TRIG1 signal causes the Q332 signal to make a low-to-high transition 546 on the next positive transition of the CLOCK2 signal.

Note that in the embodiment of FIG. 3, the first latch enable pulse generated by the synchronization circuit 210 after being released from the reset condition is the active high SYNC1 signal between the transition 452 and the transition 454 which enables the output latch 304. The initial contents of the LATCHED POINTER bus 302 may be uncertain because the input latch 300 has not yet been enabled. In order to avoid an unknown condition, the input latch 300 includes a reset (RN) input which receives the first reset signal $\overline{\text{RST1}}$. When the first reset signal is active, the outputs of the input latch 300 and thus the data on the LATCHED POINTER bus 302 are reset to all zeros. It should be understood that the input latch 300 can be enabled first by causing the fifth flip-flop 350 to be preset and the first flip-flop 330 to be reset so that the first active enable signal to be generated is the SYNC2 signal input to the input latch 300.

It can be seen from the foregoing description that the synchronization logic 306 alternately generates SYNC2 synchronization pulses which gate the pointer data onto the bus 302 in synchronization with the CLOCK1 signal and SYNC1 synchronization pulses which gate the pointer data from the bus 302 to the output bus 214 in synchronization with the CLOCK2 signal. The clock1-to-clock2 synchronization section 310 assures that the pointer data placed on the bus 302 in the CLOCK1 signal domain are stable in the CLOCK2 signal domain before the data are transferred from the bus 302. The clock2-to-clock1 synchronization section 312 assures that the pointer data have been transferred from the bus 302 to the bus 214 in the CLOCK2 signal domain before permitting the next pointer data to be placed on the bus 302 in the CLOCK1 signal domain.

It should be understood that the pointer data on the POINTER IN bus 122 may change many times while a previous pointer value is transferred to the POINTER OUT bus 214. Thus, the read controller 142 cannot monitor every change in the pointer value. Basically, the read controller 142 only monitors the write address pointer whenever it is ready to read data to verify that the data to read is current.

As long as the write address pointer monitored by the read controller 142 is less than or equal to the current write address pointer of the write controller 140, the read controller 142 will not attempt to read previously read data. The present invention precludes the read controller 142 from misreading the write address pointer by assuring that the write address pointer is always stable in the CLOCK2 signal domain.

The synchronization circuit 210 illustrated in FIG. 3 synchronizes the write address pointer being transferred from the CLOCK1 signal domain to the CLOCK2 signal domain. FIG. 5 illustrates the synchronization circuit 212 for synchronizing the transfer of the read address pointer from the CLOCK2 signal domain to the CLOCK1 signal domain. For convenience in illustrating the correspondence with the circuit of FIG. 3, the data flow from the read pointer input to the synched read pointer output is illustrated as travelling from left to right in FIG. 5. An input latch 300B gates the read pointer input from the READ POINTER bus 132 to a LATCHED POINTER bus 302B in synchronism with the CLOCK2 signal. An output latch 304B gates the latched signal to the SYNCHED READ POINTER OUT bus 216 in synchronism with the CLOCK1 signal. The synchronization is controlled by synchronization logic 306B which comprises a clock2-to-clock1 synchronization section 310B which corresponds to the clock1-to-clock2 synchronization section 310 of FIG. 3 and comprises like numbered flip-flops 330, 332, 334, 336 and exclusive-OR gates 340, 342. The synchronization logic 306B further comprises a clock1-to-clock2synchronization section 312B which corresponds to the clock2-to-clock1 synchronization section 312 of FIG. 3 and comprises like numbered flip-flops 350, 352, 354, 356 and exclusive-OR gates 370, 372. The operation of the two synchronization sections 310B, 312B in synchronously transferring pointer values from one clock domain to the other clock domain has been described above in connection with FIGS. 3 and 4 except that in FIG. 5, the pointer values are transferred from the CLOCK2 domain to the CLOCK1 domain and the clock signals and reset signals controlling the flip-flops have been interchanged in FIG. 5 with respect to FIG. 3. In particular, the input latch 300B, the first flip-flop 330, the sixth flip-flop 352, the seventh flip-flop 354 and the eighth flip-flop 356 receive the CLOCK2 signal and the second reset signal $\overline{\text{RST2}}$, and thus operate in the CLOCK2 domain. The output latch 302B, the second flip-flop 332, the third flip-flop 334, the fourth flip-flop 336 and the fifth flip-flop 350 receive the CLOCK1 signal and the first reset signal $\overline{\text{RST1}}$, and thus operate in the CLOCK1 domain. Thus, the second synchronization circuit 212 operates as described above for the first synchronization circuit 210 except that data are gated to the LATCHED POINTER bus 302 in synchronism with the CLOCK2 signal and are gated from the LATCHED POINTER bus 302 to the SYNCHED READ POINTER OUT bus 216 in synchronism with the CLOCK1 signal.

The synchronization logic 306 of FIG. 3 and the synchronization logic 306B of FIG. 5 can be combined so that only one set of synchronization logic elements is required. In particular, FIG. 6 illustrates a further alternative embodiment in which the transfer of the write address pointer and the transfer of the read address pointer are controlled by common synchronization logic for the transfer of pointer values in both directions. A synchronization circuit 600 in FIG. 6 includes a lower portion which corresponds to the synchronization circuit 210 of FIG. 3 to transfer the write address pointer from the CLOCK1 signal domain to the CLOCK2 signal domain as described above. The write address pointer propagates from left to right in FIG. 6 through the first input latch 300 to the LATCHED POINTER bus 302 in synchronism with the CLOCK1 signal. The latched write pointer on the LATCHED POINTER bus 302 is gated through a first output latch 304 to the SYNCHED WRITE POINTER OUT bus 214 in synchronism with the CLOCK2 signal. The second input latch 300B, the second LATCHED POINTER bus 302B and the second output latch 304B from FIG. 5 are included to transfer the read address pointer from right to left in FIG. 6. The read address pointer in the CLOCK2 signal domain is transferred from the read pointer bus 132 through the second input latch 300B to the second LATCHED POINTER bus 302B in synchronism with the CLOCK2 signal. The latched read pointer is transferred from the second LATCHED POINTER bus 302B through the second output latch 304B to the SYNCHED READ POINTER OUTPUT bus 216 in synchronism with the CLOCK1 signal. The reset (RN), latch enable (E) and clock inputs of the second input latch 304B are connected to the corresponding inputs of the first output latch 302. Similarly, the reset (RN), latch enable (E) and clock inputs of the second output latch 304 are connected to corresponding inputs of the first input latch 300A. Thus, the SYNC1 signal and the SYNC2 signal of the single synchronization circuit 600 in FIG. 6 operate to control both sets of latches in the manner controlled separately by the embodiments of FIGS. 3 and 5.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. A synchronization circuit which controls an interface between a write controller and a read controller in a buffer system, the write controller providing a write pointer in synchronism with a first clock and the read controller providing a read pointer in synchronism with a second clock, the synchronization circuit comprising:

a first latch which receives the write pointer in synchronism with the first clock and which generates a latched write pointer;

a second latch which receives the latched write pointer and which generates a synchronized write pointer in synchronism with the second clock;

a third latch which receives the read pointer in synchronism with the second clock and which generates a latched read pointer;

a fourth latch which receives the latched read pointer and which generates a synchronized read pointer in synchronism with the first clock; and synchronization logic which generates first, second, third and fourth latch enable signals which control the first, second, third and fourth latches, respectively, the synchronization logic timing the first latch enable signal with respect to the second latch enable signal to assure that the latched write pointer is stable with respect to the second clock signal before the second latch is enabled to generate the synchronized write pointer, the synchronization logic timing the first latch enable signal with respect to the second latch enable signal to assure that the second latch has received a previous value of the latched write pointer before enabling the first latch to generate a new value of the latched write pointer, the synchronization logic timing the fourth latch enable signal with respect to the third latch enable signal to assure that the latched read pointer is stable with respect to the first clock signal before the fourth latch is enabled to generate the synchronized read pointer, the synchronization logic timing the third latch enable signal with respect to the fourth latch enable signal to assure that the fourth latch has received a previous value of the latched read pointer before enabling the third latch to generate a new value of the latched read pointer.

2. The synchronization circuit as defined in claim 1, wherein the first latch enable signal and the third latch enable signal comprise a single latch enable signal synchronized to the first clock signal and wherein the second latch enable signal and the fourth latch enable signal comprise a single latch enable signal synchronized to the second clock signal.

3. A data transmission system for transmitting data generated in a first clock domain to a receiving system operating in a second clock domain, including a transmitting circuit transmitting data in synchronism with a first clock, a receiving circuit operating in synchronism with a second clock, and a memory system comprising a buffer, a write controller operating in synchronism with the first clock which generates a write pointer and a read controller operating in synchronism with a second clock which generates a read pointer, the memory system further comprising a synchronization circuit which provides an interface between the write controller and the read controller, the data transmission system including:

a first latch, responsive to a first latch enable signal, which receives the write pointer in synchronism with the first clock and which generates a latched write pointer;

a second latch, responsive to a second latch enable signal, which receives the latched write pointer from the first latch and which generates a synchronized write pointer in synchronism with the second clock;

a third latch, responsive to a third latch enable signal, which receives the read pointer in synchronism with the second clock and which generates a latched read pointer;

a fourth latch, responsive to a fourth latch enable signal, which receives the latched read pointer from the third latch and which generates a synchronized read pointer in synchronism with the first clock; and synchronization logic which controls the first, second, third and fourth latch enable signals, the synchronization logic generating the first latch enable signal in synchronism with the first clock signal and generating the second latch enable signal in synchronism with the second clock signal in alternating relationship with the generation of the first latch enable signal, the second latch enable signal timed to occur a sufficient time after the first latch enable signal occurs to ensure that the latched write pointer signal is stable in the second clock domain before being latched by the second latch, the first latch enable signal timed to occur a sufficient time after the second latch enable signal occurs to ensure that the second latch has received a previously latched write pointer before the first latch generates a subsequent latched write pointer, the synchronization logic generating the third latch enable signal in synchronism with the second clock signal and generating the fourth latch enable signal in synchronism with the first clock signal in alternating relationship with the generation of the third latch enable signal, the fourth latch enable signal timed to occur a sufficient time after the third latch enable signal occurs to ensure that the latched read pointer signal is stable in the first clock domain before being latched by the fourth latch, the third latch enable signal timed to occur a sufficient time after the fourth latch enable signal occurs to ensure that the fourth latch has received a previously latched read pointer before the third latch generates a subsequent latched read pointer.

4. The synchronization circuit as defined in claim 3, wherein the first latch enable signal and the third latch enable signal comprise a single latch enable signal synchronized to the first clock signal and wherein the second latch enable signal and the fourth latch enable signal comprise a single latch enable signal synchronized to the second clock signal.

* * * * *